US009224516B2

(12) United States Patent
Nelson et al.

(10) Patent No.: US 9,224,516 B2
(45) Date of Patent: Dec. 29, 2015

(54) BATTERY TAB AND PACKAGING FRAME DESIGN

(75) Inventors: Craig Nelson, Melbourne, FL (US); Robert W. Singleton, Plant City, FL (US); Michael G. Scruggs, Lakeland, FL (US); Wade W. Guindy, Henderson, NV (US)

(73) Assignee: SOLICORE, INC., Lakeland, FL (US)

( * ) Notice: Subject to any disclaimer, the term of this patent is extended or adjusted under 35 U.S.C. 154(b) by 0 days.

(21) Appl. No.: 12/466,900

(22) Filed: May 15, 2009

(65) Prior Publication Data

US 2009/0286150 A1    Nov. 19, 2009

Related U.S. Application Data

(62) Division of application No. 11/187,440, filed on Jul. 22, 2005, now abandoned.

(60) Provisional application No. 60/589,845, filed on Jul. 22, 2004.

(51) Int. Cl.
*H01M 2/18*        (2006.01)
*H01B 1/12*        (2006.01)
(Continued)

(52) U.S. Cl.
CPC ............ *H01B 1/122* (2013.01); *G06K 19/0702* (2013.01); *H01M 2/0207* (2013.01);
(Continued)

(58) Field of Classification Search
CPC .............. G06K 19/0702; H01B 1/122; H01M 10/0435; H01M 10/052; H01M 10/0565; H01M 10/058; H01M 10/30; H01M 10/345; H01M 10/425; H01M 2010/0495; H01M 2/0207; H01M 2/08; H01M 2/26; H01M 2/30; Y02E 60/122

USPC ................... 429/65, 129, 130, 138, 144, 162
See application file for complete search history.

(56) References Cited

U.S. PATENT DOCUMENTS 4,429,026 A  *  1/1984  Bruder ........................ 429/152
5,019,467 A       5/1991  Fujiwara
(Continued)

FOREIGN PATENT DOCUMENTS

EP        0821368        1/1998
EP        0823744        2/1998
(Continued)

OTHER PUBLICATIONS

Levine, et al., "Electrochemical behavior of the polypyrrole/polyimide composite by potential step amperometry," Journal of Power Sources, vol. 124, pp. 355-359 (2003).
(Continued)

*Primary Examiner* — Patrick Ryan
*Assistant Examiner* — Ben Lewis
(74) *Attorney, Agent, or Firm* — Morris, Manning & Martin, LLP; Christopher W. Raimund

(57) ABSTRACT

Improved battery packaging and constructions for batteries, particularly thin, flat-profile packaged batteries are provided. The battery packaging constructions may eliminate the need for soldering by providing current collector tabs coated by electrically conductive adhesive tape such as z-axis conductive tape and may provide support for current collector tabs and a regular battery perimeter by providing supportive battery packaging and/or frame materials. Better fabrication results, particularly when the batteries are used in smart cards, RFID tags, and medical devices.

35 Claims, 9 Drawing Sheets

(51) Int. Cl.
   *G06K 19/07* (2006.01)
   *H01M 2/02* (2006.01)
   *H01M 2/08* (2006.01)
   *H01M 2/26* (2006.01)
   *H01M 2/30* (2006.01)
   *H01M 10/04* (2006.01)
   *H01M 10/052* (2010.01)
   *H01M 10/058* (2010.01)
   *H01M 10/42* (2006.01)
   *H01M 10/0565* (2010.01)
   *H01M 10/30* (2006.01)
   *H01M 10/34* (2006.01)

(52) U.S. Cl.
   CPC .............. *H01M 2/08* (2013.01); *H01M 2/26* (2013.01); *H01M 2/30* (2013.01); *H01M 10/0436* (2013.01); *H01M 10/052* (2013.01); *H01M 10/058* (2013.01); *H01M 10/425* (2013.01); *H01M 10/0565* (2013.01); *H01M 10/30* (2013.01); *H01M 10/345* (2013.01); *H01M 2010/0495* (2013.01); *Y02E 60/122* (2013.01)

(56) References Cited

U.S. PATENT DOCUMENTS

| | | |
|---|---|---|
| 5,056,145 A | 10/1991 | Yamamoto et al. |
| 5,468,571 A | 11/1995 | Fujimoto et al. |
| 5,601,941 A * | 2/1997 | Tuttle ........................ 429/121 |
| 5,677,568 A | 10/1997 | Ochi et al. |
| 5,735,040 A | 4/1998 | Ochi et al. |
| 5,888,672 A | 3/1999 | Gustafson et al. |
| 5,895,731 A | 4/1999 | Clingempeel |
| 5,925,283 A | 7/1999 | Taniuchi et al. |
| 6,001,507 A | 12/1999 | Ono et al. |
| 6,013,393 A | 1/2000 | Taniuchi et al. |
| 6,030,728 A | 2/2000 | Cotte et al. |
| 6,096,234 A | 8/2000 | Nakanishi et al. |
| 6,109,530 A | 8/2000 | Larson et al. |
| 6,114,068 A | 9/2000 | Yamada et al. |
| 6,148,503 A | 11/2000 | Delnick et al. |
| 6,291,106 B1 | 9/2001 | Daido et al. |
| 6,296,971 B1 | 10/2001 | Hara |
| 6,315,918 B1 | 11/2001 | Mita et al. |
| 6,387,566 B1 | 5/2002 | Chang et al. |
| 6,387,567 B1 | 5/2002 | Noh |
| 6,406,817 B2 | 6/2002 | Wariishi et al. |
| 6,413,675 B1 | 7/2002 | Harada et al. |
| 6,451,480 B1 | 9/2002 | Gustfason et al. |
| 6,465,134 B1 | 10/2002 | Shibuya et al. |
| 6,503,831 B2 | 1/2003 | Speakman |
| 6,509,123 B1 | 1/2003 | Shibuya et al. |
| 6,534,214 B1 | 3/2003 | Nishijima et al. |
| 6,596,440 B2 | 7/2003 | Gavelin et al. |
| 6,617,074 B1 | 9/2003 | Watari et al. |
| 6,632,564 B1 | 10/2003 | Takahashi et al. |
| 6,641,957 B1 | 11/2003 | Kawaguchi et al. |
| 6,673,495 B1 | 1/2004 | Nishiuri et al. |
| 6,713,389 B2 | 3/2004 | Speakman |
| 7,129,005 B2 | 10/2006 | Wensley et al. |
| 7,198,870 B2 | 4/2007 | Wensley et al. |
| 2001/0038937 A1 | 11/2001 | Suzuki et al. |
| 2001/0051298 A1 * | 12/2001 | Hanafusa et al. .............. 429/162 |
| 2002/0128034 A1 | 9/2002 | Stratmoen et al. |
| 2002/0153424 A1 | 10/2002 | Li |
| 2002/0160272 A1 | 10/2002 | Tanaka et al. |
| 2002/0177039 A1 | 11/2002 | Lu et al. |
| 2002/0187377 A1 | 12/2002 | Shinoda et al. |
| 2003/0059681 A1 | 3/2003 | Noh |
| 2003/0194607 A1 | 10/2003 | Huang |
| 2003/0222755 A1 | 12/2003 | Kemper et al. |
| 2004/0009403 A1 | 1/2004 | Kim et al. |
| 2004/0018424 A1 | 1/2004 | Zhang et al. |
| 2004/0029001 A1 | 2/2004 | Yamazaki et al. |
| 2004/0043290 A1 | 3/2004 | Hatta |
| 2004/0048157 A1 * | 3/2004 | Neudecker et al. ......... 429/231.2 |
| 2004/0081890 A1 * | 4/2004 | Xing et al. .................... 429/241 |
| 2004/0229118 A1 | 11/2004 | Wensley |
| 2004/0229127 A1 | 11/2004 | Wensley |
| 2005/0026042 A1 | 2/2005 | Vallee et al. |
| 2005/0153209 A1 * | 7/2005 | Vallee et al. .................. 429/314 |
| 2005/0239917 A1 | 10/2005 | Nelson et al. |
| 2005/0263596 A1 | 12/2005 | Nelson et al. |
| 2006/0147792 A1 | 7/2006 | Nelson et al. |

FOREIGN PATENT DOCUMENTS

| | | |
|---|---|---|
| EP | 0825619 | 2/1998 |
| EP | 1439595 A2 | 7/2004 |
| JP | 05-285665 | 10/1993 |
| JP | 06-131422 | 5/1995 |
| JP | 08-344237 | 12/1996 |
| JP | 10-129213 | 5/1998 |
| JP | 10-190609 | 7/1998 |
| JP | 10284047 A | 10/1998 |
| JP | 11031486 A | 2/1999 |
| JP | 2001357825 A | 12/2001 |
| JP | 2002042884 A | 2/2002 |
| JP | 2002050337 A | 2/2002 |
| JP | 2002319437 A | 10/2002 |
| WO | 9932929 | 7/1999 |
| WO | 0213304 | 2/2002 |
| WO | 02063073 | 8/2002 |
| WO | 2005021280 A1 | 3/2005 |

OTHER PUBLICATIONS

Meador, et al., "Effects of branching on rod-coil block polyimides as membrane materials for lithium polymer batteries," Chem. Mater., vol. 15, No. 15, pp. 3018-3025 (2003).

Munnik, et al., "Stopping power measurements of 0.5-10.5 MeV7Li ions in polyimide, vyns, formvar, and polysulfone," Journal of Applied Physics, vol. 86, No. 7, pp. 3934-3938 (Oct. 1999).

Nie, et al., "Novel polymeric aromatic lithium sulfonylimides as salts for polymer electrolytes," Journal of Applied Polymer Science, vol. 85, pp. 1802-1805 (2002).

Tokuda, et al., "Synthesis, characterization, and ion-conductive behavior in an organic solvent and in a polyether of a novel lithium salt of a perfluorinated polyimide anion," Macromolecules, vol. 35, No. 4, pp. 1403-1411 (2002).

Viehbeck, et al., "Electrochemical properties of polyimides and related imide compounds," Journal of the Electrochemical Society, vol. 137, No. 5, pp. 1460-1466 (May 1990).

* cited by examiner

BATTERY TAB AND PACKAGING FRAME DESIGN

CROSS-REFERENCE TO RELATED APPLICATIONS

This application is a divisional of U.S. patent application Ser. No. 11/187,440, filed on Jul. 22, 2005, pending, which claims the benefit of U.S. provisional patent application No. 60/589,845, filed Jul. 22, 2004, the entire disclosure of which is incorporated herein by reference and for all purposes.

BACKGROUND

Thin package batteries such as polymer electrolyte batteries and lithium batteries are popular for use in many applications due to their low battery weight, long service life and high power densities. These batteries are typically fabricated with anode and cathode current collector tabs associated with the anode and cathode respectively to draw electric energy from the battery cell to an external load. Because it is desirable to minimize the size and weight of these batteries, however, the current collector tabs are generally designed to be flimsy tabs extending outwardly from the battery cell and through to the exterior of any battery packaging. As a result, the anode and cathode current collector tabs are generally susceptible to breaking off or tearing and are easily damaged during processing and installation. In addition, because the current collector tabs protrude beyond the anode and the cathode, they create an irregular perimeter around the battery cell. Upon lamination of the cell in a thin device, such as a smart card or smart label, a sink or pocket may be created by the space between the protruding tabs, resulting in surface defects that negatively affect the appearance of the device. Another significant drawback of conventional thin packaged battery designs is that the protruding current collector tabs typically require a soldering or welding step in order to make an electrical connection between the tabs and the electrical circuitry of the device into which they are to installed. Depending upon the geometry of the device in which the batteries are installed, this soldering or welding step may be difficult or impractical.

Thus, a need exists for a thin packaged battery that may be installed easily in a variety of devices without the risk of damaging the current collector tabs or creating sink holes or pockets in the device upon lamination.

SUMMARY

Batteries having improved constructions and packagings are provided. The batteries are designed to provide at least one of the following advantages: 1) some of the batteries provided herein do not require a soldering or welding step in order to be connected to an external electronic device; 2) some of the batteries provided herein include reinforced current collector tabs; and 3) some of the batteries provided herein have regular perimeter shape, such as a square or rectangular shape, which helps eliminate surface defects when the batteries are incorporated into small and/or flat electric devices such as smart cards or smart labels. The battery constructions provided herein are well-suited for the design of thin, flat-profile batteries, including laminate battery structures.

The batteries generally include a cell comprising an anode, a cathode and an electrolyte sandwiched between the anode and the cathode. An anode current collector tab can extend outwardly beyond the edge of the anode, and a cathode current collector tab can extend outwardly beyond the edge of the cathode.

In a first embodiment, the invention provides a battery comprising: (a) a battery cell, (b) at least one current collector tab extending outwardly from the battery cell, and (c) electrically conductive adhesive tape disposed on the current collector tab extending from the battery cell. In some embodiments, the batteries include two current collector tabs extending outwardly from the battery cell and electrically conductive adhesive tape disposed on one or both of the current collector tabs which allow the tabs to be electrically connected to an external electronic device without soldering or welding the tabs in place. In some battery designs a separate piece of electrically conductive adhesive tape is placed on each current collector tab. In these embodiments the tape may be isotropically conductive. In other battery designs a strip of z-axis anisotropically electrically conductive adhesive tape (i.e., tape that conducts only in the direction perpendicular to the plane of the tape) is placed over and bridging both current collector tabs. In this design the strip of tape partially or entirely covers the space defined between the two tabs and creates a more regular perimeter for the battery.

In some embodiments the batteries include a frame disposed around the periphery of the battery cell. A portion of this frame can be disposed adjacent and in contact with at least one current collector tab.

In another embodiment, the invention provides a battery with a double frame design, the battery comprising: (a) a battery cell; (b) at least one current collector tab having a distal end extending from the battery cell; (c) a tab support frame disposed around the periphery of the battery cell; and (d) an opposing frame disposed opposite and substantially parallel to the tab support frame; wherein the at least one current collector tab is disposed between the tab support frame and the opposing frame and further wherein a portion of the at least one current collector tab extends beyond the edge of the opposing frame but not beyond the edge of the tab support frame.

In this battery design, the support frame material serves as a support for the current collector tab and provides a more regular perimeter for the battery. However, the current collector tab remains exposed and accessible to electrical contact from the direction opposite the support frame. As a result electrically conductive adhesive tape may be applied over the exposed surface of the current collector tab in order to provide electrical connections between the tab and electrical contacts in a device into which the battery is to be installed.

In still another embodiment, the invention provides a battery with a single frame design, the battery comprising: (a) a battery cell; (b) at least one current collector tab having a distal end extending from the battery cell; (c) a tab support frame disposed below the batter cell and having an outer edge that extends beyond the periphery of the battery cell; and (d) a lower packaging material disposed below the battery cell; wherein the at least one current collector tab is supported by the tab support frame. Typically, the battery will also include an upper packaging material disposed above the battery cell. Together, the upper and lower packaging materials may form a pouch for the battery cell. In some embodiments, the upper packaging material has an outer edge that does not extend to the distal end of the current collector tab, such that a portion of the current collector tab extends beyond the outer edge of the upper packaging material but not beyond the outer edge of the tab support frame.

As in the previous embodiment, the support frame material serves as a support for the current collector tab and provides a more regular perimeter for the battery. However, the current collector tab remains exposed and accessible to electrical contact from the direction opposite the support frame. Electrically conductive adhesive tape may be applied over the exposed surface of the current collector tab.

In yet another embodiment, the invention provides a battery with a frameless design, the battery comprising: (a) a battery cell; (b) at least one current collector tab having a distal end extending from the battery cell; (c) a lower packaging material disposed below the battery cell and having an outer edge that beyond the periphery of the battery cell; wherein the lower packaging material supports the current collector tab. Typically, the battery will also include an upper packaging material disposed above the battery cell. Together, the upper and lower packaging materials may form a pouch for the battery cell. In some embodiments, the upper packaging material has an outer edge that does not extend to the distal end of the current collector tab, such that a portion of the current collector tab extends beyond the outer edge of the upper packaging material but not beyond the outer edge of the lower packaging material. It should be understood that the "lower packaging material" and an "upper packaging material" may be composed of separate pieces of packaging material or of a single continuous piece of packaging material that is, for example, folded over a battery cell. In the latter case the terms "upper packaging material" and the "lower packaging material" simply refer to different section of the continuous piece of packaging material.

In this design, the lower packaging material serves as a support for the current collector tab and provides a more regular perimeter for the battery. However, the current collector tab remains exposed and accessible to electrical contact from the direction opposite the lower packaging material. Electrically conductive adhesive tape may be applied over the exposed surface of the current collector tab. In some instances, this design may result in a packaged battery having a non-uniform cross-sectional height, wherein the cross-sectional height of the packaged battery is larger in the center (where the battery cell is located) that at the ends (e.g., where the packaging materials and/or conductive tape come together). In such instances, the battery may include an external frame designed to seats around the raised center of the packaged battery (i.e., around the battery cell) to provide a more uniform cross-sectional height.

In another embodiment, the invention provides a method of forming an electrical connection between a battery comprising at least one current collector tab and a battery-powered device, the method comprising disposing electrically conductive adhesive tape between the current collector tab and an electrical contact of the battery-powered device.

In another embodiment, the invention provides a method for forming a battery having at least one current collector tab, the method comprising applying electrically conductive tape to the current collector tab.

In another embodiment, the invention provides a method for forming a battery comprising a battery cell with at least one current collector tab extending outwardly therefrom, the method comprising:

(a) providing a tab support frame disposed around the periphery of the battery cell;

(b) providing an opposing frame disposed opposite and substantially parallel to the tab support frame; and (c) disposing at least one current collector tab between the tab support frame and the opposing frame such that a portion of the current collector tab extends beyond the edge of the opposing frame but not beyond the edge of the tab support frame.

In another embodiment, the invention provides a method for forming a battery comprising a battery cell with at least one current collector tab extending outwardly therefrom, the method comprising:

(a) providing a tab support frame disposed around the periphery of the battery cell;

(b) providing an upper packaging material disposed above and extending beyond the periphery of the battery cell;

(c) disposing at least one current collector tab between the tab support frame and the upper packaging material such that a portion of the current collector tab extends beyond the edge of the upper packaging material but not beyond the edge of the tab support frame; and optionally;

(d) disposing a lower packaging support frame disposed below the tab support frame.

In another embodiment, the invention provides a method for forming a battery comprising a battery cell with at least one current collector tab extending outwardly therefrom, the method comprising:

(a) providing a lower packaging material disposed below and extending beyond the periphery of the battery cell;

(b) providing an upper packaging material disposed above and extending beyond the periphery of the battery cell;

(c) disposing at least one current collector tab between the lower packaging material and the upper packaging material such that a portion of the current collector tab extends beyond the edge of the upper packaging material but not beyond the edge of the lower packaging material; and optionally;

(d) an external frame disposed above the upper packaging material or below the lower packaging material and seated around the periphery of the battery cell.

In other embodiments, the invention provides use of z-axis conductive tape to provide electrical connection between a battery tab and an external device. Also provided is a packaged lithium battery comprising two tabs extending from the battery cell, wherein the tabs are in contact with z-axis conductive tape, and a frame member or a packaging material which is substantially flush with the distal ends of the tabs. In an alternative embodiment, the outer edge of the (lower) packaging material or frame member is not substantially flush with the distal end of the at least one current collector, and the distal end of the current collector extends beyond the outer edge of the (lower) packaging material or frame member.

The batteries may be used in a broad range of devices. However they are particularly well suited for use inside smart cards, smart labels, RFID tags, medical devices, and other small devices which require high temperature/high pressure lamination processing and which benefit from an on board power supply. Although batteries are a preferred embodiment, other embodiments of the invention are with other types of electrochemical systems such as, for example, supercapacitors and membrane-electrode assemblies.

A basic and novel feature of some of the embodiments is that battery structures can be made without the need to solder or weld current collector tabs. Another basic and novel feature is the use of conductive adhesives, including curable conductive adhesives, to provide electrical connections between current collector tabs and external devices. These features represent important manufacturing improvements.

DRAWINGS

Figure 8:
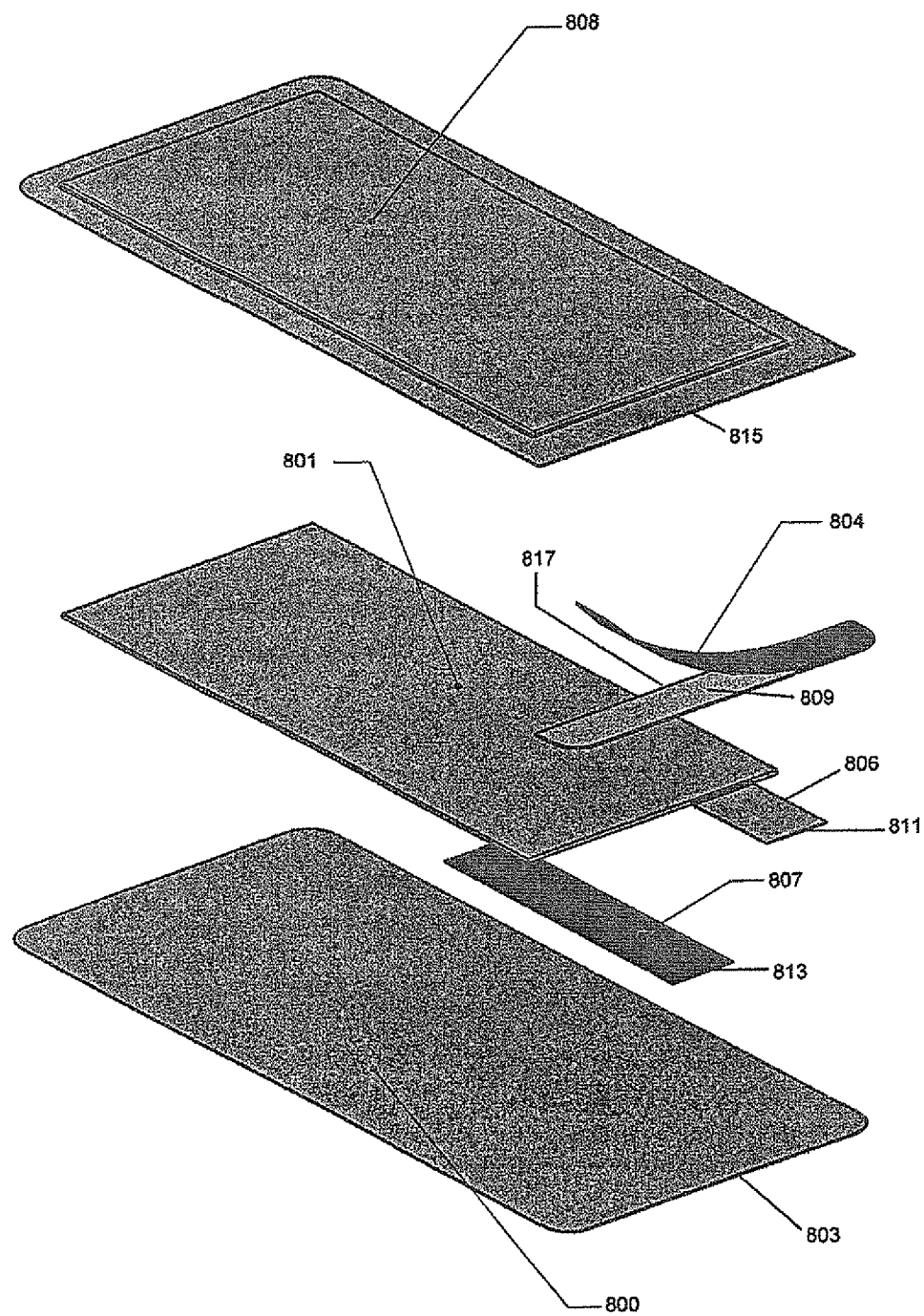
FIG. 8 illustrates an exploded view of an embodiment which uses no frame but uses the packaging material to support current collector tabs.
Figure 9A:
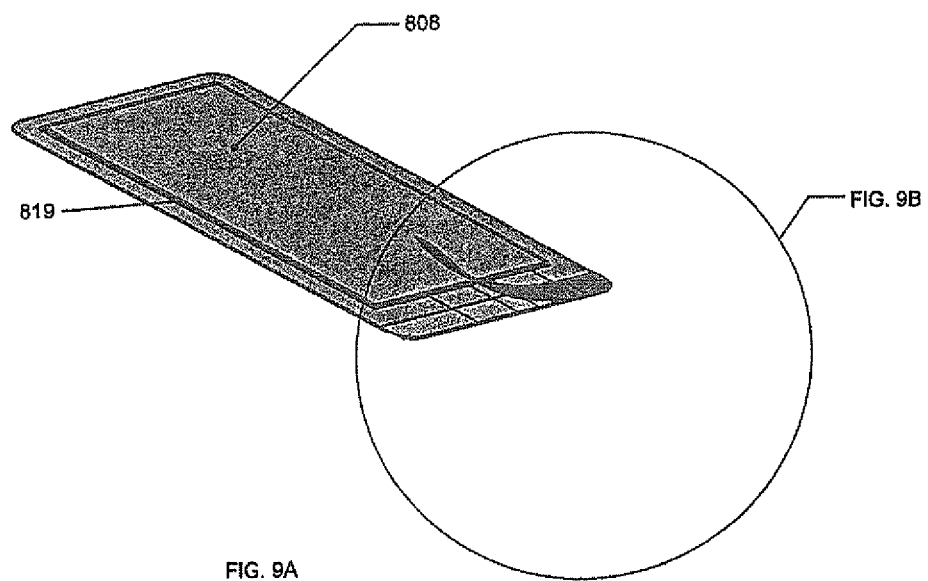

FIGS. 9A (top) and 9B (bottom) illustrate perspective views of the battery of FIG. 8 in an assembled state.

Figure 10A:
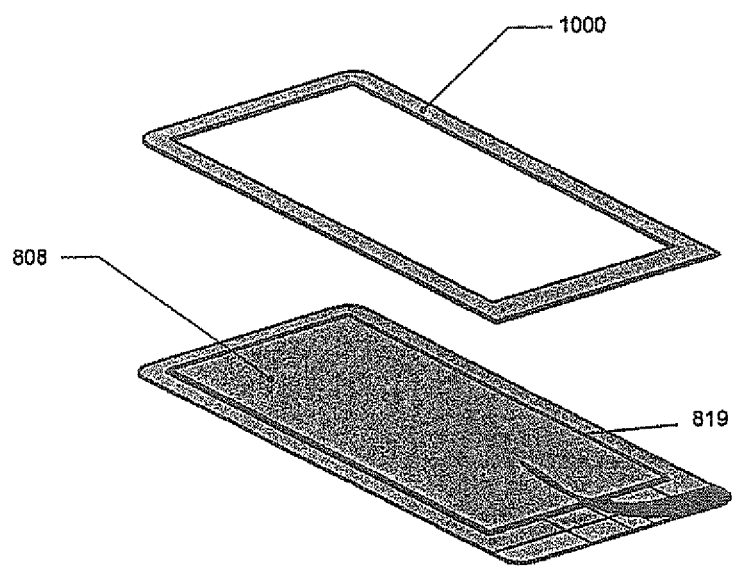
Figure 10B:
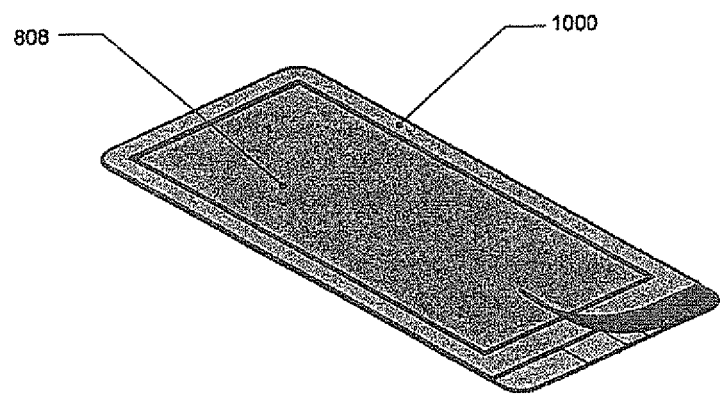

FIGS. 10A (top) and 10B (bottom) illustrate an external frame embodiment to provide greater uniformity in thickness, wherein FIG. 10A shows an exploded view and FIG. 10B shows a perspective, assembled view.

DETAILED DESCRIPTION

Batteries having improved packaging and construction and methods for the production of those batteries are provided. In some embodiments, the batteries provided herein do not require a soldering or welding step in order to be connected to an external electronic device. In other embodiments, batteries with reinforced current collector tabs are provided. In still other embodiments, batteries having a regular perimeter shape, such as a square or rectangular shape, are provided. Finally, some of the batteries provided herein include a combination of two or more of these features.

The batteries include a battery cell having an anode, a cathode, and an electrolyte disposed between the anode and the cathode. An anode current collector tab for delivering electric energy from the battery cell to an external device is attached to and extends outwardly beyond the periphery of the anode. Similarly, a cathode current collector tab is attached to and extends outwardly beyond the periphery of the cathode. The battery designs provided herein may be used with a broad range of batteries including, but not limited to, metal hydride (e.g., Ni-MH) batteries, nickel-cadmium (Ni—Cd) batteries, lithium ion, and lithium metal batteries. These batteries may have solid, liquid or polymer electrolytes. Examples of batteries that are suitable for use in the present invention are described in U.S. patent application Ser. Nos. 10/437,778; 10/437,559; and 10/437,546, filed May 13, 2003 to Wensley et al., the entire disclosures of which are incorporated herein by reference. Other suitable batteries are described in U.S. Provisional Patent Application No. 60/545,179, filed Feb. 18, 2004 (see also, Ser. No. 11/061,751 filed Feb. 18, 2005), the entire disclosure of which is incorporated herein by reference. Other batteries and battery elements are described in, for example, U.S. Pat. Nos. 5,888,672 and 6,451,480 to Gustafson et al. which are hereby incorporated by reference in their entirety.

Other battery elements, designs, and packagings are known in the art and can be adapted to be used with the present invention, including technology described in, for example, U.S. Patent application no. 2003/0059673 to Langan et al., and U.S. Pat. No. 6,080,508 to Dasgupta et al.; U.S. Pat. No. 6,251,537 to Kim et al.; U.S. Pat. No. 6,515,449 to Thomas et al.; U.S. Pat. No. 5,965,298 to Harada et al.; U.S. Pat. No. 6,610,445 to Moriwaki et al.; U.S. Pat. No. 6,656,232 to Usui et al.; U.S. Pat. No. 5,057,385 to Hope et al.; U.S. Pat. No. 5,326,653 to Chang; U.S. Pat. No. 5,456,813 to Grange-Cossou et al.; U.S. Pat. No. 6,045,946 to Maggert et al.; U.S. Pat. No. 6,106,975 to Watanabe et al.; U.S. Pat. No. 6,145,280 to Daroux et al.; and U.S. Pat. No. 6,267,790 to Daroux et al.

The invention encompasses a variety of battery shapes including rectilinear or curvilinear structures. Preferred shapes include square and rectangular. The shape can be curved or rounded. The shape of the battery is preferably adapted to fit cleanly into a larger structure such as the pocket of a smart card. In many cases, the shape is kept simple such as a rectangle or circle to facilitate inexpensive manufacturing and strong structures.

The anode current collector tab and the cathode current collector tab are desirably made from a conductive web or sheet like material. In some embodiments of the batteries, the current collector tabs are composed of metal foils such as aluminum, copper, or nickel foils. Tabs based on electrodeposited copper or nickel flashed copper can be used. The current collector tab can be, for example, an electrodeposited copper tab (18 microns). The current collector tabs are desirably thin so that packaging materials may be easily sealed around them. For example, the current collector tabs may have a thickness of no more than about 10 mils and desirably, no more than about 1 mil (where 1 mil=$\frac{1}{1000}$ inch). However, current collector tabs having a thickness outside of these ranges may also be employed. In some embodiments, the current collector tabs may comprise an extension protruding from a larger current collector sheet disposed adjacent an anode or a cathode. In other embodiments, the tab may comprise a strip of material disposed on, and extending outwardly beyond the edge of, a current collector sheet, an anode or a cathode.

One aspect of the present invention provides a battery that may be easily installed in a variety of electronic devices without the need to solder or weld the current collector tabs to the circuitry of the device. This aspect of the invention provides a battery that includes at least one current collector tab. For example, the battery may include an anode having an anode current collector tab extending outwardly from its periphery, a cathode having a cathode current collector tab extending outwardly from its periphery, an electrolyte disposed between the anode and the cathode, and electrically conductive adhesive tape disposed on the anode current collector tab and/or on the cathode current collector tab. In this construction, the electrically conductive adhesive tape forms the electrical connection between each current collector tab and one or more electrical contacts in the device into which the battery is to be installed. This electrical connection eliminates the need to solder or weld the battery tabs in place. Further description is provided below for FIGS. 1 and 2.

In some battery designs, a separate piece of electrically conductive adhesive tape may be placed on each of the two current collector tabs. In this design, the electrically conductive adhesive tape may be isotropically electrically conductive or anisotropically conductive. Anisotropically conductive tapes are not electrically conductive along all of their dimensions. For example, z-axis anisotropically conductive tape generally conducts electricity along its z-axis (i.e., in the direction perpendicular to the plane of the tape). In an alternative battery design, a strip of the electrically conductive adhesive tape is placed over both current collector tabs such that it bridges the tabs. In order to maintain electrical isolation between the two current collector tabs, anisotropically conductive tape which conducts generally along the z axis is used in this design. The use of a strip of electrically conductive adhesive tape across both tabs may be advantageous because the tape helps to fill the space between the tabs, making the perimeter of the battery cell more regular and helping to prevent sink holes or other surface defects from forming when the battery is laminated into a thin device, such as a smart card or label.

The electrically conductive adhesive tapes used to make the electrical contacts are typically made from adhesives having electrically conductive particles dispersed therein. The electrically conductive tapes optionally include a release liner which may be easily removed to expose the adhesive tape before or after, but usually before, the battery has been placed into a device. A variety of adhesives may be used to make the electrically conductive tapes. These include, but are not limited to, pressure sensitive adhesives, heat sensitive adhesives, and heat curable adhesives. Specific types of adhesives that may be used to construct the electrically conductive adhesive tapes include, but are not limited to, acrylic adhesives, silicone adhesives, epoxy adhesives, and polyether amide adhesives. Electrically conductive fibers and particles, which generally can have anisotropic shape to provide anisotropic properties, may be dispersed in the adhesives include, but are not limited to, nickel particles, gold coated polymer particles, and silver coated glass particles. Suitable electrically conductive adhesive tapes are commercially available from 3M. Specific examples of anisotropically electrically conductive tapes available from 3M include Electrically Conductive Tape 9703, Z-Axis Adhesive Film 5460R, Z-Axis Adhesive Film 5552R, Z-Axis Adhesive Film 7313, and Z-Axis Adhesive Film 7303. Another suitable example of an anisotropically conductive (z-axis) tape that may be used in the production of the present batteries is described by Ishibashi et al., AMP Journal of Technology, 5, 24-30 (1996).

Technical literature further describing tapes, anisotropic tapes, and anisotropic conductive tapes include, for example, U.S. Pat. Nos. 6,260,262 (3M); 5,422,200; 6,517,618; 6,293,470 and patent publications 2003/0002132; 2003/0209792; and 2001/0015483.

A second aspect of the present invention provides a battery having one or more supported current collector tabs. In one embodiment of this aspect of the invention, the battery cell includes a frame around its periphery. The peripheral frame may be a two-piece frame with a first frame around the anode or generally associated with the anode side, and a second frame around the cathode or generally associated with the cathode side. At least one current collector tab can extend outwardly from the edge of the battery between the two frames. One end of one frame (i.e., the "tab support frame") is longer than the corresponding end of the other frame (i.e., the "opposing frame") such that the tab support frame provides support for the current collector tab on one side, while leaving the tab exposed and accessible from the opposing side. As previously described, the exposed side of the tab may have an electrically conductive adhesive tape disposed thereon in order to provide electrical contact between the current collector tab and the electronic device into which the battery is to be installed. In some embodiments the peripheral frame may be in the form of a pocket or sleeve in which the two frames are actually sealed together at one or more points or along one or more edges, such that the battery cell can be slipped into the peripheral frame. In some embodiments, the tab supporting end of the tab support frame is long enough that the leading edge of the support frame is flush with or extends beyond the distal end of the current collector tab such that the tab support frame provides a regular battery perimeter. In some embodiments, the frame actually has a central opening into which a battery cell may be inserted. In other embodiments the frame may be a continuous sheet of material that covers and extends beyond the periphery of a battery cell, such that the peripheral edges of the sheet "frame" the battery. Further description is provided below with respect to the figures.

Conventional battery frame materials can be used including thermoplastic plastics. The frame material is typically a plastic, such as polyethylene terephthalate (PET), desirably having a total thickness that is substantially the same as the thickness of the battery cell itself, whether the frame is one piece or comprises two or more pieces. In some embodiments, the frame can comprise a PET layer (200 microns) sandwiched between layers of MR PVA (24 and 9 micron layers). Each frame is characterized by an interior surface which is the surface facing towards the current collector tabs and an exterior surface which is the opposing surface facing away from the current collector tabs. The frame material may be a multilayered material including a polymeric layer and one or more sealant layers adapted to seal the frames to one another, to the tabs and/or to an outer packaging layer. For example, a tab sealant may optionally be applied to at least a portion of the interior surface of the tab support frame in order to adhere the current collector tabs to that frame. Alternatively, the tab sealant may be applied to the current collector tabs before they are contacted with the tab support frame. This tab sealant is desirably a material that not only heat seals to itself, but also bonds strongly to the current collector tabs of the battery and preferably activates between about 90° C. and 100° C. In some embodiments, the sealant may be a low temperature pressure activated sealant.

The battery cells typically include an electrically insulative and desirably moisture and vapor resistant packaging material surrounding the battery cell. The packaging material may be a multilayered packaging material including one or more sealing layers, one or more electrically insulative layers and one or more moisture and/or vapor barrier layers. For example, the outer packaging material may have a binder adhesive coated on at least a portion of its exterior surface to help bind the battery into an electronic device, such as a smart card. The binder adhesive is desirably a heat activated adhesive which activates at temperatures of at least about 100.degree. C. A binder adhesive may also be applied to at least a portion of the interior surface of the packaging material to bind the outer packaging material to the battery cell and/or frames. This interior binder adhesive desirably has an activation temperature which is lower than the activation temperature of the exterior binder adhesive. In one embodiment, the outer packaging material includes (i) an upper packaging layer disposed above and attached to the exterior surface of one of either the tab support frame or the opposing frame, and (ii) a lower packaging layer disposed below and attached to the exterior surface of the other of the tab support frame or the opposing frame.

Suitable materials that may be used for the various components of the batteries, including packaging materials, anode and cathode materials, polymer electrolyte materials, and current collector and/or current collector tab materials, are described above including, for example, in U.S. Pat. Nos. 5,057,385; 5,326,653; and 6,145,280, the entire disclosures of which are incorporated herein by reference, and the co-pending Wensley patent applications.

A first embodiment, therefore, is a battery comprising: (a) a battery cell, (b) at least one current collector tab extending from the battery cell, and (c) electrically conductive adhesive tape disposed on the at least one current collector tab extending from the battery cell. In a preferred embodiment, the battery cell comprises at least two current collector tabs extending from the battery cell. In a preferred embodiment, the battery cell is substantially planar and substantially rectangular, and the current collector tab extending from the battery cell is substantially planar and substantially rectangular. In a preferred embodiment, the battery comprises a battery cell comprising: (a) an anode, (b) a cathode, (c) an electrolyte disposed between the anode and the cathode; and at least two current collector tabs extending from the battery cell, wherein a first current collector tab is an anode current collector tab extending from the anode, and a second current collector tab is a cathode current collector tab extending from the cathode. In a preferred embodiment, the cell is a substantially rectangular, substantially planar cell with two length sides and two width sides and the cell comprises at least two current collector tabs extending from one width side of the cell. In a preferred embodiment, the cell is a substantially rectangular, substantially planar cell with two length sides and two width sides and the cell comprises at least two current collector tabs extending from one length side of the cell. In a preferred embodiment, the electrically conductive adhesive tape is substantially planar and substantially rectangular in shape. In a preferred embodiment, the electrically conductive adhesive tape is an anisotropic electrically conductive tape that conducts in the direction perpendicular to the plane of the tape. In a preferred embodiment, the electrically conductive adhesive tape has a length which is substantially the same as the width of the cell. In a preferred embodiment, the current collector tab extends from the cell by a tab extension length, and the electrically conductive adhesive tape has a width which is substantially the same as the tab extension length. In a preferred embodiment, the cell comprises at least two current collector tabs which each extend from the cell by a tab extension length which is the same length for each of the current collector tabs, and the electrically conductive adhesive tape has a width which is substantially the same as the tab extension length. The tab extension length can be measured by conventional means. In a preferred embodiment, the battery has a length with two ends and has substantially the same thickness at each end. In a preferred embodiment, the electrically conductive adhesive tape is an anisotropic electrically conductive tape that conducts in the direction perpendicular to the plane of the tape, wherein the cell comprises both anode and cathode and further comprises both anode current collection tab and a cathode current collection tab, and the tape is disposed on both anode and cathode current collector tabs, wherein the battery is substantially shaped as a rectangle. In a preferred embodiment, the cell comprises at least two current collector tabs and separate pieces of electrically conductive adhesive tape are each disposed on the current collector tabs without contacting each other. In a preferred embodiment, the electrically conductive adhesive tape comprises an adhesive having conductive fibers or particles dispersed therein. In a preferred embodiment, the electrically conductive adhesive tape is a pressure sensitive adhesive tape. In a preferred embodiment, the electrically conductive adhesive tape is a heat sensitive adhesive tape. In a preferred embodiment, the electrically conductive adhesive tape comprises a release liner.

In a preferred embodiment, a battery frame is disposed around the periphery of the cell. In a preferred embodiment, a battery frame is disposed around the periphery of the cell, and the frame comprises at least two frame pieces including a first frame piece and a second frame piece. In a preferred embodiment, the frame comprises a polymer layer and at least one heat-sealable layer. In a preferred embodiment, a battery frame is disposed around the periphery of the cell and an outer packaging material is disposed on the cell. In a preferred embodiment, one of the first and second frame pieces is elongated with respect to the other so that the elongated piece can support the current collector tab or tabs. In a preferred embodiment, the leading edge of the elongated frame piece and the distal end of the tab or tabs are substantially flush with each other. In a preferred embodiment, the battery comprises at least two tabs extending from the cell and the distal end of each tab is flush with the leading edge of the elongated frame piece.

In a preferred embodiment, the battery is a lithium metal or lithium ion battery. In a preferred embodiment, the battery is a polymer electrolyte battery. In a preferred embodiment, the cell comprises an electrolyte with a soluble polyimide. In a preferred embodiment, the cell comprises a polymer matrix electrolyte. In a preferred embodiment, the polymer matrix electrolyte comprises a polyimide, at least one lithium salt and at least one solvent. In a preferred embodiment, the lithium salt is present in a concentration of at least 0.5 moles of lithium per mole of imide ring provided by the polyimide. In a preferred embodiment, the polymer matrix electrolyte is substantially optically clear. In a preferred embodiment, the anode comprises a lithium powder and a polymer binder. The polymer binder can be a high temperature polymer which is heat-resistant. For example, it can have a glass transition temperature of at least 100° C., or at least 150° C. The polymer binder can be selected so that it does not react with the lithium powder. In one embodiment, the polymer binder is a polyimide. In a preferred embodiment, the lithium powder has an average particle size of no more than about 20 microns. In a preferred embodiment, the cathode comprises a polyimide, an electronic conductive filler and a metal oxide. In a preferred embodiment, the electrolyte layer comprises solvent in an amount of about 10 wt. % to about 50 wt. %, and more particularly, about 15 wt. % to about 40 wt. %, and more particularly, about 20 wt. % to about 30 wt. %.

FIGS. 1-10 represent preferred embodiments.

Figure 1:
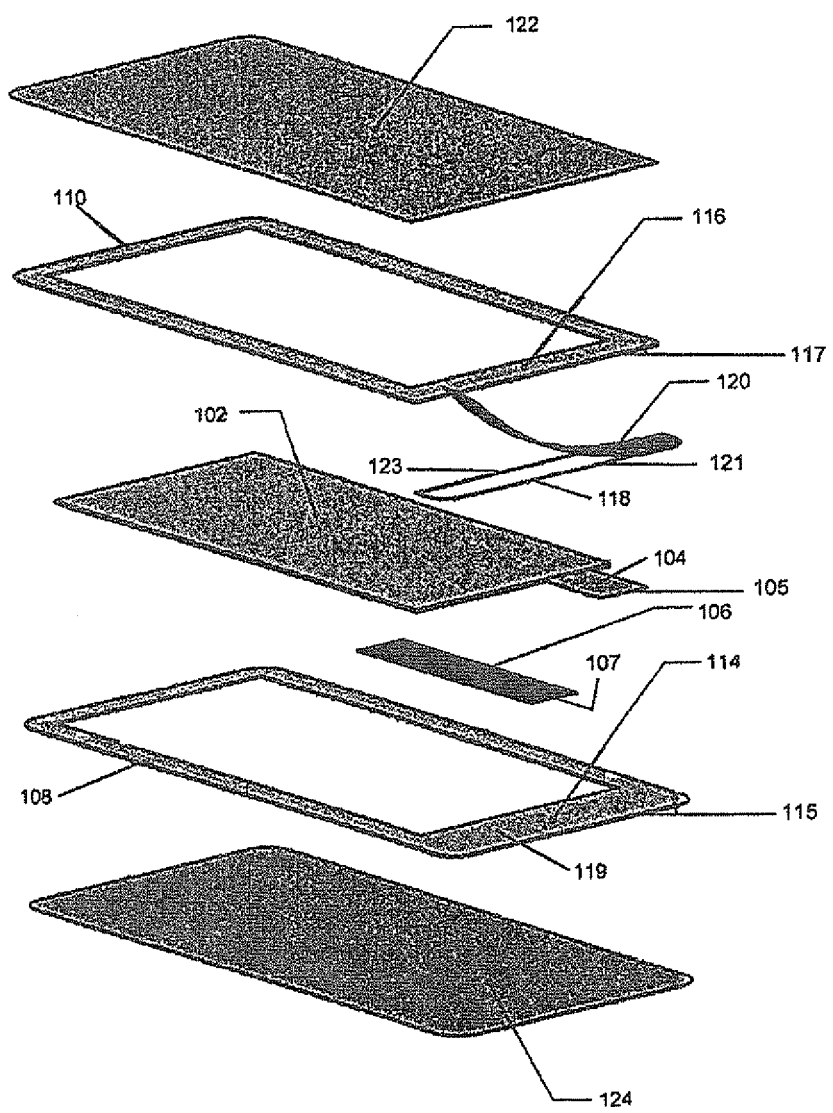
FIG. 1 shows the components of a battery having a double frame design in an embodiment of the present invention in a exploded, disassembled state.

FIGS. 1 and 2 show the components of an exemplary embodiment of a battery 100 in accordance with the present invention. In the design shown in these figures, a double frame construction is employed. FIG. 1 shows the battery in a disassembled state while FIG. 2 shows the battery in its assembled state. The battery includes a battery cell 102 including an anode current collector tab 104 and a cathode current collector tab 106. The current collector tabs have distal ends 105, 107 extending outwardly from the battery cell. The battery 100 further includes a tab support frame 108 disposed below the battery cell 102 and an opposing frame 110 disposed above the battery cell 102. As shown in the figure, one end 114 (i.e., the tab supporting end) of the tab support frame 108 has an outer edge 115 that extend out further than the outer edge 117 of corresponding end 116 of the opposing frame 110. A strip of z-axis anisotropically electrically conductive adhesive tape 118 (depicted as a transparent tape) is disposed at the end 116 of the opposing frame 110 over the anode and cathode current collector tabs 104, 106. As shown in the figure, the electrically conductive tape has an outer edge 121 that may be flush with, or substantially flush with, the distal ends 105, 107 of the current collector tabs 104, 106 and an inner edge 123 directed toward the outer edge 117 of opposing frame 110. The electrically conductive adhesive tape 118 includes a release liner 120 (shown partially peeled away) that may be removed easily to expose the electrically conductive adhesive tape 118 to electrical contacts in a device once the battery has been inserted into the device. Alternatively, the liner can be removed during the manufacture of the battery or at any other time prior to inserting the battery into a electrical device. As shown in the figures, the tab support frame 108 provides support for the anode and cathode current collector tabs 104, 106 on one side, while the electrically conductive adhesive tape 118 leaves them accessible for electrical connections on the opposite side. Optionally, a tab sealant layer (e.g., an adhesive material) may be applied to the interior surface 119 of the tab supporting end 114 of the tab support frame 108 in order to adhere the current collector tabs 104, 106 to that frame. The battery may also include an outer packaging material, shown here as a two part material composed of an upper packaging layer 122 disposed above the opposing frame 110 and a lower packaging layer 124 disposed below the tab support frame 108. The upper and lower packaging layers 122, 124 may be attached to the opposing frame 110 and tab support frame 108 by an appropriate adhesive or heat sealing layer (not shown).

Figure 3:
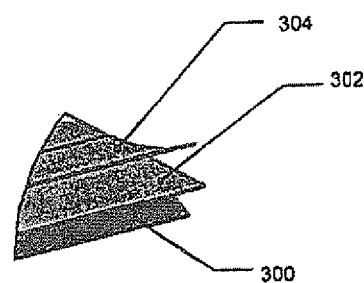
FIG. 3 shows an expanded view of a multilayered outer packaging material.

FIG. 3 shows an expanded view of a multilayered outer packaging material that may be used to house the battery cell 102. This material includes an insulating heat sealing layer 300 to electrically insulate the battery cell 102 from its surroundings and to heat seal the outer packaging material to frames 108 and 110. A vapor barrier layer 302 (e.g., an aluminum layer or multilayer aluminum foils) is disposed above the heat sealing layer 300 and a binder layer 304 for helping to bind the battery to an electronic device is disposed above the vapor barrier layer 302. The outer packaging material in FIG. 3 can be used as an upper or a lower packaging material, and both the upper and lower packaging materials can be designed as in FIG. 3 if desired.

Figure 4:
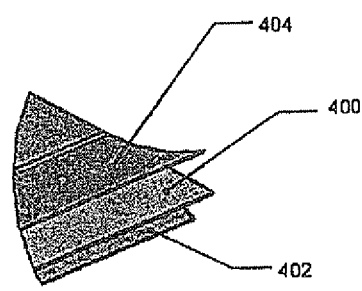
FIG. 4 shows an expanded view of a multilayered frame material.

FIG. 4 shows an expanded view of a multilayered frame material that may be used to frame the battery cell 102. This material includes a polymeric layer 400 sandwiched between two heat seal layers 402, 404 which serve to heat seal the polymeric layer 400 around the current collector tabs 104, 106 and to the upper and lower packaging layers 122, 124. Good bonding between an interior adhesive layer and the battery current collector or frame can provide excellent flexibility.

Figure 5:
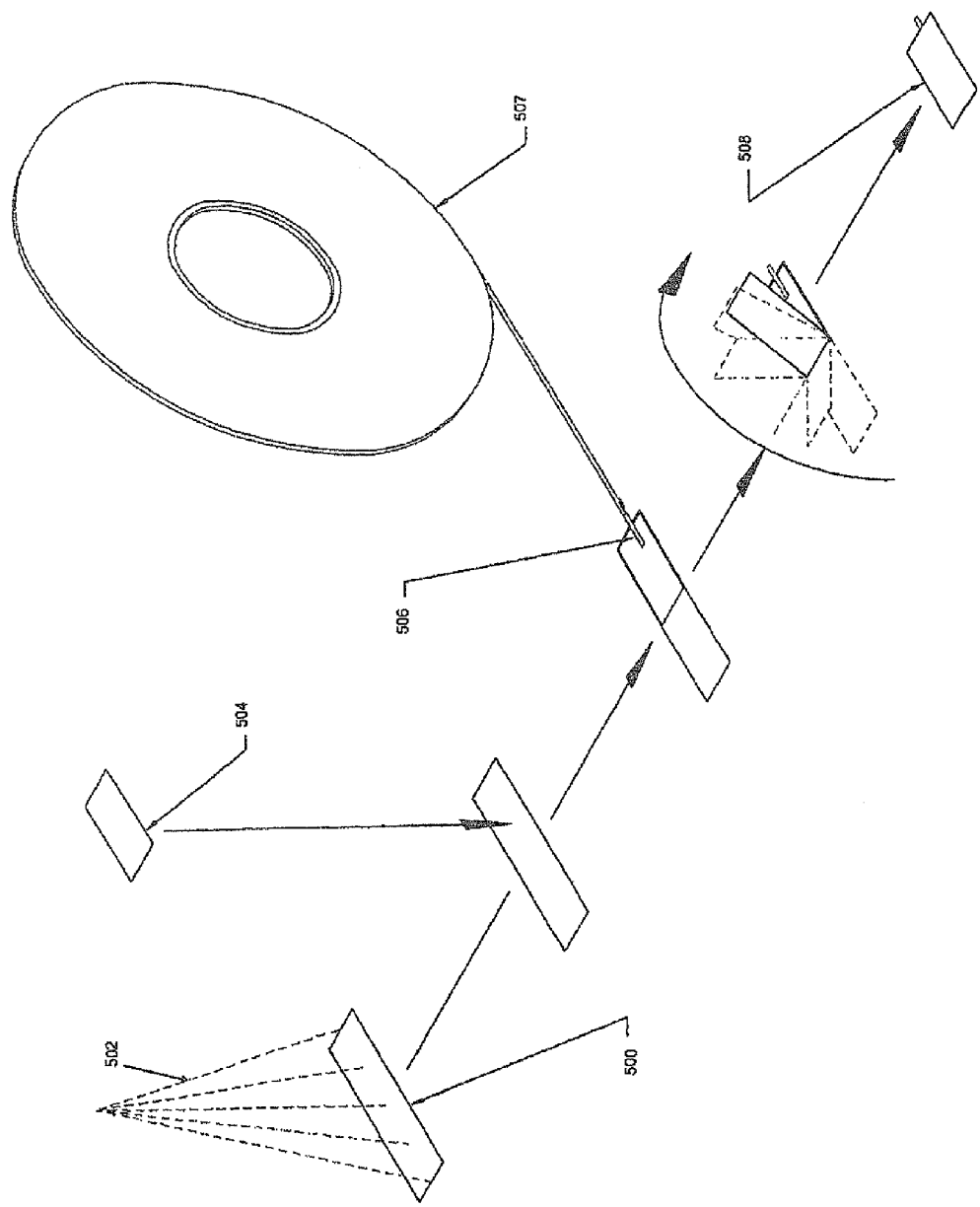
FIG. 5 shows an illustrative assembly process for producing a battery cell having an anode, a cathode, an electrolyte, and an anode current collector tab.

FIG. 5 shows an illustrative assembly process for producing a bicell battery having an anode, a cathode, an electrolyte, and an anode current collector. In this process, a cathode having a polymer electrolyte coated on the surface thereof 500 is provided. For adhesion purposes, a small amount of adhesive solvent 502 may be sprayed onto the polymer electrolyte overcoated cathode 500. After the application of the solvent, an anode 504 such as a lithium metal anode which has an area slightly less than the area of the polymer electrolyte overcoated cathode 500 is placed on the polymer electrolyte overcoated cathode. An anode current collector tab 506, which may be unwound, feed and cut from a roll of tab material 507, such as a nickel current collector material, is placed over the anode 504 such that it extends outwardly from the periphery of the battery cell. The portion of the polymer electrolyte overcoated cathode 500 which is not covered by the anode 504, is folded over, wrapping the polymer electrolyte overcoated cathode 500 over the anode 504 as shown in FIG. 5. The result is a thin battery bicell 508 having an anode current collector tab 506 which is ready for packaging.

Figure 6:
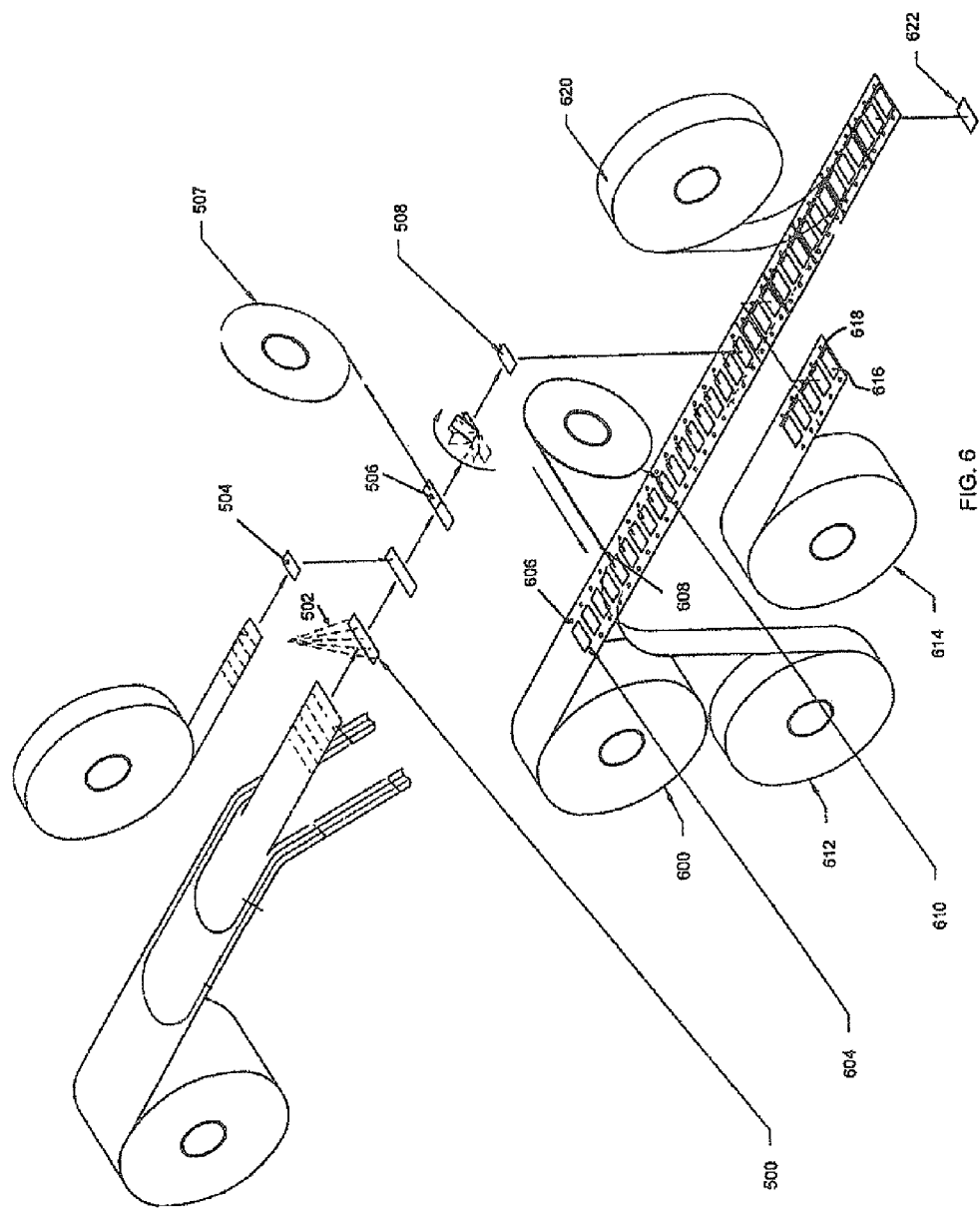
FIG. 6 shows an assembly process for packaging multiple battery cells produced by the assembly process of FIG. 5.

FIG. 6 shows an assembly process for packaging multiple battery cells produced by the assembly process of FIG. 5, where the steps of the assembly process shown in FIG. 5 are repeated at the top of FIG. 6 for convenient reference. As shown in FIG. 6, a lower frame material 600 may be rolled out from a suitable roller, the frame material being a material such as PET, desirably having a thickness substantially the same as the battery cell 508 itself. Openings 604 for the battery cells and, optionally, one or more registration holes 606, may be created in the lower frame material 600 using a suitable window punch, a programmable laser cutter, or an equivalent. A cathode current collector tab 608, supplied from a suitable roller 610, is then cut, and applied to the lower frame material 600 such that it partially overlaps a frame opening 604. Optionally, a tab sealant may be applied to at least a portion of the lower frame material 600 in order to help adhere the current collector tabs 506, 508 to the lower frame material 600. A lower outer packaging layer material 612, supplied from a suitable roller and desirably including a low temperature heat sealant and moisture barrier, is then applied to the lower frame material 600. The battery cell 508 of FIG. 5 is then placed into an opening 604 in the lower frame material 600 and onto the lower outer packaging layer 612. The lower outer packaging layer 612 may be heated (e.g., at 90° C.) prior to placing the battery cell 508 thereon in order to promote adhesion. An upper frame material 614 for the battery may be made in a manner similar to that used for making the lower frame material 600 where a upper frame material 614 is rolled out from a suitable roller and openings 616 are created in the upper frame material 614. A strip of z-axis anisotropically electrically conductive adhesive tape 618 placed above an opening 616 in the upper frame material 614. The upper frame material 614 is then placed over the battery cell 508 such that the electrically conductive adhesive tape 618 is positioned over the anode and current collector tabs 506, 608. An upper outer packaging layer 620, desirably having a low temperature heat sealant and moisture barrier layer, which may be of the same composition as the lower outer packaging material 612, is then rolled out from a suitable roller and applied over the battery cell 508. Optionally, a binder material may be included on the exterior surfaces of the upper and lower outer packaging layers 620, 612 in order to facilitate the insertion of the resulting battery into a device such as a smart card.

Two additional preferred embodiments: A) a single frame embodiment; and B) a frameless embodiment, are now described in reference to FIGS. 7-10. Optionally, an external frame can be used in the "frameless" embodiment (FIG. 10). These embodiments can improve the stability of the battery to long term moisture ingress, as the number of seal layers can be reduced. This is particularly significant for lithium metal batteries because moisture can be very detrimental to lithium metal.

Figure 7:
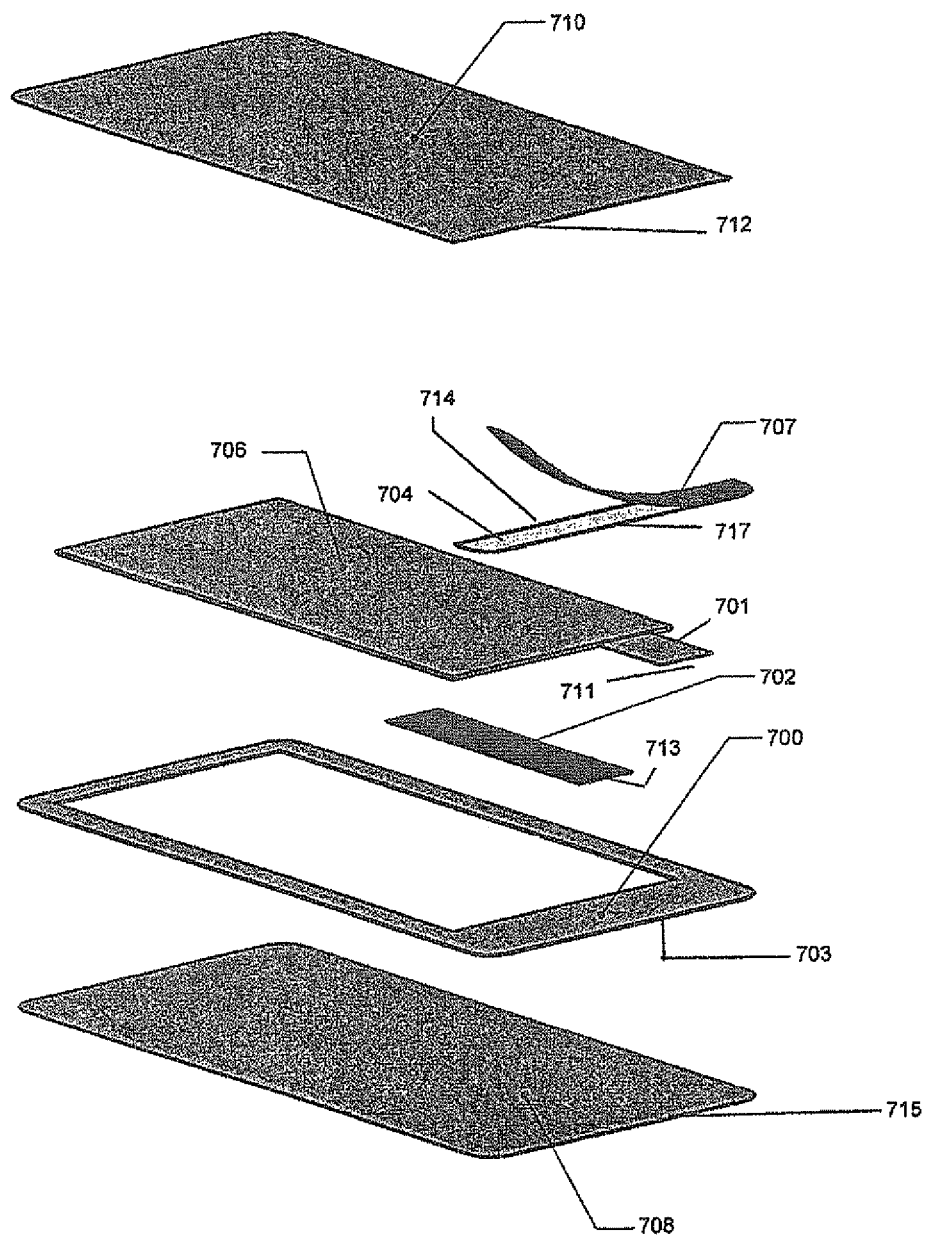
FIG. 7 illustrates an exploded view of an embodiment which uses a single piece frame to support current collector tabs.

FIG. 7 illustrates an exploded view of elements in a battery having a single frame design. In this embodiment, a one piece frame, 700, is used rather than a two piece frame as shown in FIG. 1. A lower packaging material 708 having substantially the same shape and perimeter dimensions as the one piece frame 700 may be disposed below and attached to the frame 700. In the depicted embodiment, the outer edge 715 of the lower packaging material 708 and the outer edge 703 of the frame 700 are substantially flush with each other. The frame 700 is disposed below the battery cell 706 and has an outer edge 703 that generally extends beyond the periphery of the battery cell 706. Two current collector tabs 701, 702 having distal ends 711, 713, extend from the periphery of the battery cell 706. The length and width dimensions of the battery cell 706 are not as long as those of the frame and lower packaging material. Hence, there is a gap 705 defined between the periphery of the battery cell and the outer edge of the frame. This gap may be about 3 mm wide, for example. The current collector tabs 701, 702 extend over this gap 705 so that the distal ends 711, 713 of the tabs are substantially flush with the outer edges of the frame 703 and lower packaging material 715. Thus, the current collector tabs 701, 702 rest on the top of and are supported by the frame 700. FIG. 7 also illustrates a strip of electrically conductive tape 704, which can be an anisotropic conductive tape, disposed over the current collector tabs 701, 702. The electrically conductive tape 704 is shown here with a release liner 707 partially peeled away. Hence, the current collector tabs 701, 702 are sandwiched between the conductive tape 704 and the frame 700 and, as shown in this embodiment, their distal ends 711, 713 are substantially flush with the outer edge of the conductive tape 717 and the outer edge of the frame 703. Finally, an upper packaging material 710 is designed to cover the assembled battery cell 706, but is not as large as the lower packaging material 708. Rather, the outer edge 712 of the upper packaging material 710 can be substantially flush with the inner edge 714 of the strip of conductive tape 704, or a small gap (not shown) can be engineered between the outer edge of the upper packaging material and the inner edge of the conductive tape. One skilled in the art can determine the best spatial relationship between the strip of adhesive tape and the upper packaging material and whether a small gap should be used. Contact between the upper packaging material and the top of the adhesive tape can result in shorting. Upon assembly, the top surface of the structure comprises the upper packaging material and conductive tape. In other words, the total area of the upper surface of the packaged battery, which is equal to, or substantially equal to, the area of the lower surface of the lower packaging material 708 is approximately the sum of the area of the upper surface of the upper packaging material 710 and the area of the upper surface of the adhesive tape 704. One advantage of this design is that, because a single piece frame is used, only two seals are present, wherein (i) one seal joins the frame 700 with the upper packaging material 710 and (ii) the other seal joins the frame 700 with the lower packaging material 708.

Figure 2A:
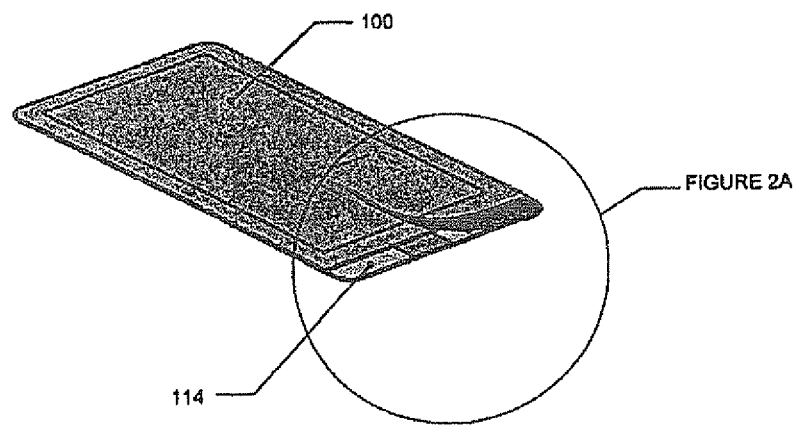
FIGS. 2A and 2B show the components of a battery having a double frame design in an embodiment of the present invention in an assembled state.
Figure 2B:
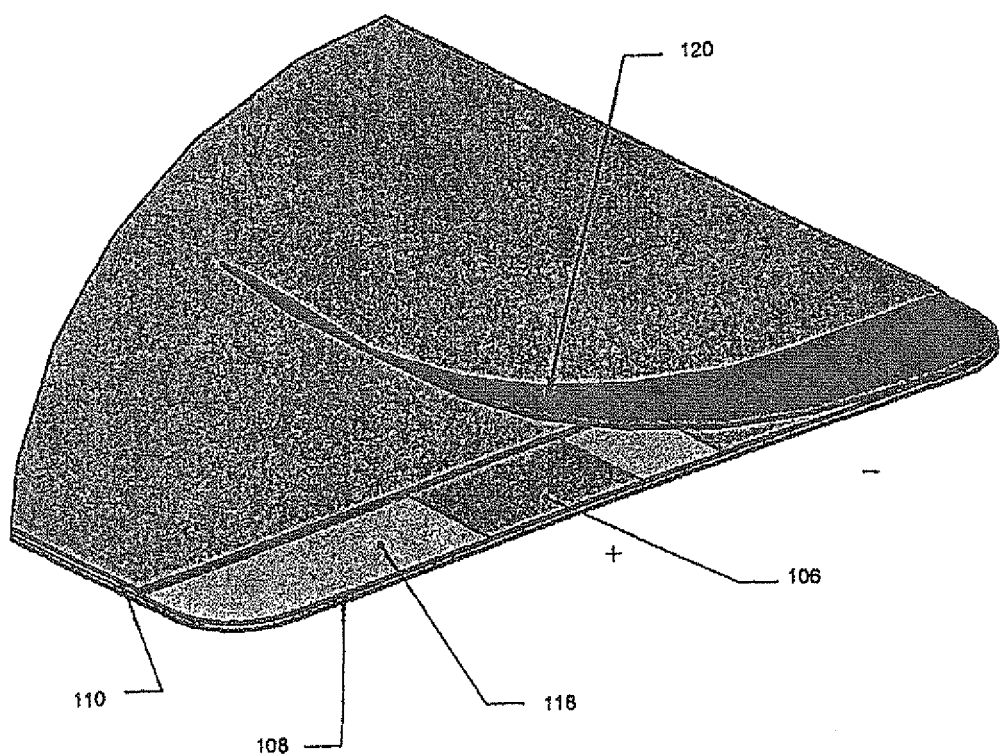

Upon assembly of the exploded elements in FIG. 7, the structure looks substantially like the structure in FIGS. 2a and 2b. In addition, packaging materials and frame materials which can be used in FIG. 7 are also illustrated in FIGS. 3 and 4.

FIG. 8 illustrates an exploded view of an embodiment of a battery having a frameless design, or at least absence of an internal frame, which can be called a pouch cell, a bagged cell, or a sachet cell embodiment. In this design, no frame is present between the packaging materials. Rather, an assembled battery cell 801 with two current collector tabs 806, 807, having distal ends 811, 813, extending outwardly from its periphery is disposed above a lower packaging material 800 and below an upper packaging material 808 without an internal frame. As noted below, an external frame can be provided (see FIG. 10). Here, the length and width dimensions of the lower packaging material 800 are longer than those of the assembled battery cell 801. Hence, there is a gap 805 defined between the periphery of the battery cell and the outer edge of the lower packaging material 800. This gap may be about 3 mm wide, for example. The current collector tabs 806, 807 which extend outwardly from the periphery of battery cell 806 extend over this gap 805 so that the distal ends 811, 813 of the tabs are substantially flush with the outer edge 803 of the lower packaging material 800. Thus, the current collector tabs 806, 807 rest on the top of and are supported by the lower packaging material 800. FIG. 8 also illustrates a strip of conductive tape 809, which can be an anisotropic conductive tape, disposed over the current collector tabs 806, 807. The conductive tape is shown here with a release liner 804 partially peeled away. FIG. 8 also shows the upper packaging material, 808. This upper packaging material 808 can be substantially the same as the upper packaging material 710 in FIG. 7. Also, the outer edge 815 of the upper packaging material 808 may be substantially flush with the inner edge 817 of the strip of conductive tape 809, or a small gap (not shown) can be engineered between the outer edge 815 of the upper packaging material 808 and the inner edge 817 of the strip of conductive tape 809.

Figure 9B:
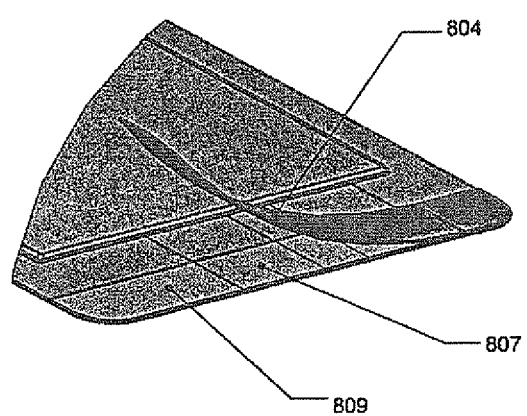

FIGS. 9a and 9b illustrate perspective views of the exploded structure in FIG. 8 in the assembled state. In these figures, the upper packaging material 808 is shown with a raised middle portion 819 due to the underlying battery cell 801. Upon assembly, the raised portion 819 may be formed as the underlying battery cell 801 is pressed against the upper packaging material 808.

FIGS. 10a and 10b illustrate a preferred embodiment which can improve upon the frameless embodiment shown in FIGS. 8 and 9. In FIG. 10a, an external frame, 1000, is used to help provide a battery having a substantially uniform cross-sectional height. In this embodiment, the height of the external frame 1000 is substantially the same as the height of the raised middle portion 819 of the battery. As shown in FIGS. 10a and 10b, the external frame 1000 is disposed over the upper packaging material 808 and is adapted to seat around the raised middle portion 819 of the battery. This external frame compensates for the raised portion and provides a more uniform cross-sectional height. A more uniform cross-sectional height provides better assembly and better cosmetic appeal in larger structures such as smart cards.

Although four sided seals can be carried out in these embodiments, three sided seals can also be carried out. For example, a single piece of packaging material can be folded over to provide upper and lower packaging materials from a single continuous piece of material. The fold can be on the side of the battery cell opposite the side from which the current collector tabs extend.

Although the battery constructions and packaging designs provided herein may be adapted for use with a variety of battery types, they are particularly well-adapted as designs for flat packaged batteries, such as thin polymer electrolyte batteries as described above in U.S. Pat. Nos. 5,888,672 and 6,451,480 to Gustafson et al. and in U.S. patent application Ser. Nos. 10/437,778; 10/437,559; and 10/437,546, filed May 13, 2003 to Wensley et al. Briefly, these batteries can include polymer matrix electrolytes based on polyimides. More specifically, these batteries can include electrolytes composed of a polyimide, a lithium salt and at least one solvent. The lithium salt is desirably present in a concentration of at least 0.5 moles of lithium per mole of imide ring and the polymer electrolyte is desirably substantially optically clear. Other batteries that may benefit from the tab and packaging constructions provided herein include those described in U.S. Provisional Patent Application No. 60/545,179. These batteries can include anodes composed of lithium powder and a polymer binder.

The present batteries are well suited for use inside smart cards, smart labels, RFID tags, medical devices, and other small devices which require lamination processing (e.g., high temperature/high pressure lamination or low temperature/reduced pressure lamination) and which benefit from an on board power supply. In some applications, use at low temperatures can be needed which would result in selection of materials for use of low temperature lamination or cold lamination (e.g., high temperature materials may not be needed). This is particularly true for batteries having regular perimeters (e.g., rectangular or square) which can be laminated into small, relatively flat devices without creating sinks, pockets or other surface defects. The various components of the battery may be selected (e.g., as described in U.S. patent application Ser. Nos. 10/437,778; 10/437,559; and 10/437,546, filed May 13, 2003 to Wensley et al.) to be able to withstand standard hot lamination processes used in the smart card industry. For example, in some instances, the batteries may be designed to withstand temperatures of 125 to 140° C. and pressures of 200 to 250 psi for dwell times of 5 to 15 minutes.

The term smart card may be used to refer to any of a variety of electronically readable cards. These cards, which are generally small flexible cards, e.g., plastic cards about the size of a credit card, typically include a microprocessing unit, a memory and an interface for transmitting and receiving data from an external source. A typical smart card includes a processor coupled to an electrically erasable programmable read-only memory (EEPROM), read only memory (ROM) and/or random access memory (RAM). These components are fabricated onto a single integrated chip which further includes a microprocessor for executing instructions and storing data in the memory. Such smart cards further include an input/output (I/O) signal interface for exchanging I/O signals between the smart card and an external device, such as a card reader. U.S. provisional patent application 60/570,097 filed May 12, 2004 (see also, Ser. No. 11/127,299 filed May 12, 2005) further describes smart cards and charging designs which can be used in combination with the present embodiments and adapted as needed to use with the present embodiments, the entire disclosure being incorporated by references.

Smart labels (also known as radiofrequency identification (RFID) tags) refer to electrically powered labels that may be used to track a vast range of products. Smart labels typically include microprocessing unit, an antenna and an encapsulating material and/or support. The label may be powered by electric fields generated by a reader and communicate with the reader through its antenna.

Medical devices can be adapted to incorporate the embodiments of the invention described herein. For example, sensors can be fabricated to measure the temperature of a product such as blood which is temperature sensitive, and the sensor powered with batteries as described herein.

The electronic device can comprise the battery as described herein and an electronic circuit. An electrical connection can be established between the at least one current collector tab and the electronic circuit without a weld or solder. In preferred embodiments, the device can be a smart card, a smart label, an electronically readable card, an RFID tag, an electrically powered label, a medical device, a sensor, a temperature measurement device, or a wearable medical device.

The invention has been described with reference to various specific and illustrative embodiments. However, it should be understood that many variations and modifications may be made while remaining within the spirit and scope of the following claims.

What is claimed is:

1. A battery comprising:
   a battery cell;
   a first current collector tab and a second current collector tab each having a first portion in contact with the battery cell and a distal end extending from the battery cell;
   a lower packaging material disposed below the battery cell and having an outer portion that extends beyond a periphery of the battery cell; and
   an upper packaging material disposed above the battery cell wherein the upper and lower packaging materials provide a pouch for the battery cell;
   wherein the outer portion of the lower packaging material supports at least a portion of each of the first and second current collector tab;
   wherein a tab support frame comprising a polymeric film and one or more sealant layers is interposed between the first and second current collector tabs and the outer portion of the lower packaging material;
   wherein the upper packaging material has an outer edge that dose not extend to the distal end of the first and second cuttent collector tabs; and
   wherein the polymeric film of the tab support frame does not extend between the battery cell and the lower packaging material.

2. The battery of claim 1, wherein the edge of the outer portion of the lower packaging material extends at least to the distal end of the first and second current collector tab.

3. The battery of claim 1, wherein the distal end of each of the first and second current collector tabs extends beyond the edge of the outer portion of the lower packaging material.

4. The battery of claim 1 wherein the upper packaging material and the lower packaging material are comprised of a single continuous piece of packaging material.

5. The battery of claim 1, further comprising an electrically conductive tape disposed over the first and second current collector tab.

6. The battery of claim 5, wherein the electrically conductive tape has an outer edge that is substantially flush with the distal end of the at first and second current collector tab and an inner edge that is directed toward the outer edge of the upper packaging material.

7. The battery of claim 6, wherein a gap is defined between the inner edge of the electrically conductive tape and the outer edge of the upper packaging material.

8. The battery of claim 5, wherein the electrically conductive tape comprises a z-axis anisotropic electrically conductive tape.

9. The battery of claim 1, having a raised middle portion, the battery further comprising an external frame seated around the raised middle portion.

10. The battery of claim 9, wherein the external frame has a height that is substantially equal to height of the raised middle portion.

11. The battery of claim 1, wherein the battery is a lithium metal battery, a lithium ion battery or a polymer electrolyte battery.

12. The battery of claim 1, wherein the battery comprises an electrolyte comprising polyimide, lithium salt, and solvent.

13. An electronic device comprising the battery of claim 1 and an electronic circuit.

14. The device of claim 13 wherein an electrical connection between the first and second current collector tab and the electronic circuit is established without a weld or solder.

15. The device of claim 14, wherein the first and second current collector tabs are connected to the electronic circuit with a conductive adhesive.

16. The device of claim 15, wherein the first and second current collector tabs are connected to the electronic circuit with a curable conductive adhesive.

17. The device of claim 15, wherein the first and second current collector tabs are connected to the circuit using a conductive epoxy adhesive.

18. The battery of claim 1, wherein the cell is rectangular and wherein the first and second current collector tabs extend from the same side of the cell.

19. The device of claim 13, wherein the device is a smart card, a smart label, an electronically readable card, an RFID tag, an electrically powered label, a medical device, a sensor, a temperature measurement device, or a wearable medical device.

20. The battery of claim 1, wherein the outer portion of the lower packaging material extends beyond the distal ends of the first and second current collector tabs.

21. The battery of claim 1, wherein the battery cell comprises an anode, a cathode and an electrolyte between the anode and cathode.

22. The battery os claim 21, wherin the electrolyte is coextensive with the cathode.

23. The battery of claim 1, wherin the battery cell comprises:
- a first cathode layer on the lower oackaging material;
- a first electrolyte layer on the first cathode layer;
- an anode layer on the first electrolyte layer;
- a second electrolyte layer on the anode layer,and
- a second cathode layer on the second electrolyte layer.

24. The battery of claim 23, wherein the first cathode layer and the second cathode layer are a single continuous piece of material.

25. The battery of claim 24, wherein the first electrolyte layer and the second electrolyte layer are a single continuous layer of electrolyte material.

26. The battery of claim 23, wherein the battery comprises a single anode layer.

27. The battery ao claim 1, wherein the tab support frame comprises the polymeric layer sandwiched between first and second sealant layers.

28. The battery o claim 1, wherein an opposing tab support frame comprising a polymeric layer and one or more sealant layers is interposed between the first and second current collector tabs and the upper packaging material.

29. The battery of claim 28, wherein the opposing tab support frame extends to the edge of the upper packaging material.

30. The battery of claim 28, wherein the oppsing tab support frame comprises the polymeric layer sandwiched between first and second sealant layers.

31. The battery of claim 1, wherein the tab support frame extends to the edge of the outer portion of the lower packaging material.

32. The battery of claim 1, wherein the upper packaging material and the lower packaging material each comprise a vapor barrier layer.

33. The battery of claim 32, wherein the vapor barrier layer comprises aluminum.

34. The battery o claim 33, wherein the upper packaging material and the lower packaging material each further comprise one or more sealing layers.

35. The battery of claim 1, wherein the polymeric film of the tab support comprises polyethylene terephthalate.

* * * * *

UNITED STATES PATENT AND TRADEMARK OFFICE
CERTIFICATE OF CORRECTION

PATENT NO. : 9,224,516 B2  
APPLICATION NO. : 12/466900  
DATED : December 29, 2015  
INVENTOR(S) : Nelson et al.

Page 1 of 1

It is certified that error appears in the above-identified patent and that said Letters Patent is hereby corrected as shown below:

IN THE CLAIMS:

In Claim 1, Column 15, line 63, replace "tab" with --tabs--

In Claim 1, Column 16, line 2, replace "dose" with --does--

In Claim 1, Column 16, line 3, replace "cuttent" with --current--

In Claim 2, Column 16, line 9, replace "tab" with --tabs--

In Claim 5, Column 16, line 18, replace "tab" with --tabs--

In Claim 6, Column 16, line 21, replace "the at first" with --the first--

In Claim 6, Column 16, line 21, replace "tab" with --tabs--

In Claim 10, Column 16, line 34, replace "equal to height" with --equal to the height--

In Claim 14, Column 16, line 45, replace "tab" with --tabs--

In Claim 22, Column 17, line 4, replace "os" with --of--

In Claim 23, Column 17, line 6, replace "wherin" with --wherein--

In Claim 23, Column 17, line 8, replace "oackaging" with --packaging--

In Claim 23, Column 17, line 11, replace "layer,and" with --layer; and--

In Claim 27, Column 17, line 21, replace "ao" with --of--

In Claim 28, Column 18, line 1, replace "o" with --of--

In Claim 30, Column 18, line 8, replace "oppsing" with --opposing--

In Claim 34, Column 18, line 19, replace "o" with --of--

Signed and Sealed this  
Twenty-sixth Day of April, 2016

Michelle K. Lee  
*Director of the United States Patent and Trademark Office*